Dec. 10, 1929.                J. C. BOHMKER                1,738,685
                        EGG TURNER FOR INCUBATOR TRAYS
                            Filed Oct. 15, 1927
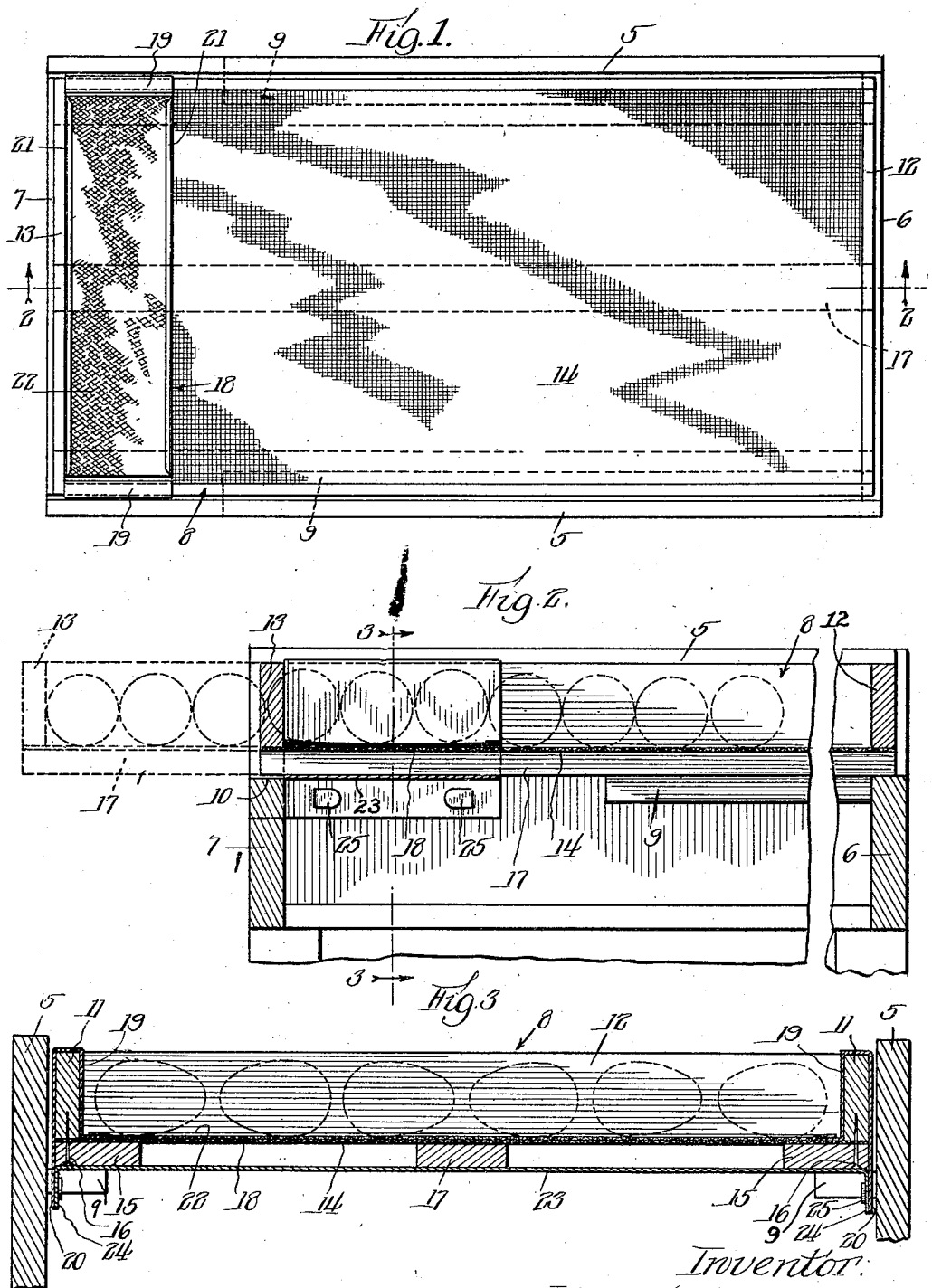
Inventor:
John C. Bohmker Patented Dec. 10, 1929

1,738,685

UNITED STATES PATENT OFFICE

JOHN C. BOHMKER, OF BRADLEY, ILLINOIS, ASSIGNOR TO SEARS, ROEBUCK AND CO., OF CHICAGO, ILLINOIS, A CORPORATION OF NEW YORK

EGG TURNER FOR INCUBATOR TRAYS

Application filed October 15, 1927. Serial No. 226,314.

The invention relates generally to an egg turner for incubator trays and more particularly to an egg turner which is operated automatically upon the movement of the incubator tray relative to the incubator.

It has generally been customary in the art to which this invention relates to provide devices by which the eggs may be turned at certain intervals during the incubating period. Heretofore, however, such devices have been manually operable, which necessitates the use of more or less cumbersome apparatus and which requires that the incubator be constructed to permit access to the operating mechanism of the egg turner.

It is an object of this invention to provide a new and improved means for turning the eggs in an incubator tray, which turning means is actuated automatically during certain parts of the operations of caring for the eggs.

It is a further object of the invention to provide an improved egg turning means, which is carried by the incubator tray upon which the eggs are supported, in such manner that the egg turning means will be operated by the withdrawal of the tray from the incubator.

Another object of the invention is to provide an egg turning device which, during the egg turning operation, is guided and supported to prevent deviation from its normal movement and to prevent tipping thereof relative to the tray.

Other objects and advantages will become apparent from the following detailed description of a preferred embodiment of the invention and from the accompanying drawings, in which:

Figure 1 is a plan view of the invention as used in an incubator, the upper portion of the incubator being removed to show the egg supporting tray.

Fig. 2 is a longitudinal section through the incubator tray on the line 2—2 of Figure 1 looking in the direction of the arrows.

Fig. 3 is a sectional view taken upon the line 3—3 of Fig. 2 looking in the direction of the arrows.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring to the drawings 5, 6 and 7 indicate the side, rear and front walls of an incubator respectively, the dimensions of which will, of course, depend entirely upon the desired egg capacity thereof. The incubator is provided with a tray upon which the eggs to be incubated are placed. This tray is generally designated 8 and is arranged to slide into and out of the incubator in the usual manner. Elongated supports 9, securely mounted in the incubator, provide a supporting means upon which the rear portion of the incubator tray 8 rests in the incubator. As may be seen in Figs. 1 and 2 the supporting members 9 stop short of the front wall 7 of the incubator for a purpose which will be presently described. The front wall 7, which is cut away in part to permit the entrance of the tray into the incubator, provides an upper portion or sill 10, for the support of the front edge of the incubator tray.

In the preferred embodiment the incubator tray 8 is of a size to fit relatively snugly within the incubator and comprises a frame having side walls 11, rear wall 12 and front wall 13. Preferably the bottom 14 or the surface upon which the eggs are supported is of a suitable foraminous, substantially rigid material, such as wire screen or the like, and is secured in any suitable manner to the tray. As an additional means for securing the supporting bottom 14 to the frame a pair of supports 15 extend longitudinally of the frame and are secured as by the nails 16 to the side walls 11 of the tray. A centrally positioned bottom supporting member 17 extends longitudinally of the tray beneath the screen and is suitably secured to the end members 12 and 13 of the tray.

During the operation of the incubator it is customary at certain intervals of the incubating period to remove the incubator tray and to turn the tray end for end before replacing the tray in the incubator, and at the same time the eggs thereon are usually turned. In attaining the objects of the invention an egg turning device is associated with the egg tray in such manner that the withdrawal of the tray from the incubator effects a movement of the egg turning device whereby the eggs will be automatically turned. The device is also of such character that after the tray has been reversed or turned end for end and replaced in the incubator the device is again in its initial position.

In this instance the turning device comprises a flat egg turning member 18 positioned immediately above the egg supporting surface 14 and extending across the width of the tray. Preferably the egg engaging member 18 is of sheet metal but since the eggs would not be engaged by a smooth metallic surface with sufficient force to effect the necessary turning movement of the eggs, it is desirable to provide a supplementary surface of a material which is adapted to engage the eggs. It has been found that canvas or a like material is satisfactory for this purpose and a surface of this material is secured upon the member 18, as by providing side flanges 21 thereon, which may be bent downwardly to clamp the supplementary canvas surface 22 thereto. At each end adjacent the side walls 11 of the tray a continuation of the egg turning member 18 is bent upwardly, then outwardly and thence downwardly to provide a U shaped guide 19 which fits over and is adapted to slide along the side walls 11 of the tray. As may be seen in Fig. 3 the outer legs of the U shaped member 19 extend downwardly as at 20 for a short distance below the lower surface of the supports 15. Thus the projecting portions 20 are adapted to engage the sill 10 of the front wall 7 of the incubator to provide what may be termed a stop-engagement therebetween.

In order that the member 18 shall be sufficiently rigid to prevent tipping or displacement during the sliding movement along the tray a supporting member 23 extends across the width of the tray beneath the bottom supports 15 and 17 and is provided with downwardly extending flanges 24 arranged to be positioned adjacent the downwardly projecting portions 20 of the U shaped member 19. The flanges 24 are secured to the projecting ends 20 in any suitable manner as by providing a part thereof struck outwardly to provide lugs 25 which extend through suitable apertures in the portion 20 and then may be turned to clamp the parts rigidly together.

By this construction an egg turning device has been provided which is permanently mounted upon the tray and which is guided in its longitudinal sliding movement thereacross by means of the U shaped members 19 travelling along the side edges 11 of the tray and the supporting member 23 sliding beneath the bottom supports 15. Furthermore, the engagement of the supporting member 23 with the bottom of the tray positively prevents tipping of the device relative to the tray during the egg turning operation.

In operation the tray is filled with eggs and is positioned in the incubator with the downwardly projecting portions 20, 24 of the egg turning device occupying the position immediately to the rear of the front wall 7 of the incubator and extending downwardly below the sill 10 thereof into the gap or space provided in the incubator between the front wall 7 and the front end of the tray supporting member 9. Thus, when the tray is withdrawn from the incubator, the front edge of the downwardly extending portion 20, 24 engages the sill 10 of the incubator and is held stationary by this engagement while the egg supporting tray is withdrawn from the incubator. During this movement the egg engaging member will slide successively between the plurality of rows of eggs and the surface 14 and the engagement of the canvas covering 22 with the eggs in its passage therebeneath will effect the desired turning of the eggs. After the tray has been substantially withdrawn from the incubator it is only necessary to lift the rear end of the tray a short distance to disengage the forward edge of the downwardly projecting members 20, 24 from the sill 10 when the tray may be removed bodily from the incubator. It will be apparent after this operation that the egg turning device occupies a position at what formerly was the rear end of the tray. After the tray has been removed from the incubator the tray is turned end for end and replaced therein. Thus the egg turning device is again at what is now the forward end of the tray and after the tray has been almost entirely slid into the incubator the front end is lifted to permit the downwardly projecting portions 20, 24 to pass over the sill 10 as the tray is returned to its normal position.

It will be apparent from the foregoing that an egg turning device for incubator trays has been provided which, upon the removal of the tray from the incubator, will be automatically moved along the tray to turn the eggs supported thereon, which device is automatically returned to an operating position when the tray is replaced in the incubator. Moreover, an egg turning device of this character is simple in construction, may be cheaply manufactured and is efficient in operation.

I claim as my invention:

1. The combination with a tray for incubators comprising, a frame and an egg supporting surface secured thereto, of an egg turning device secured to the tray and adapted to slide longitudinally over the egg supporting surface to effect the turning of the eggs supported thereon, said device including means rigid therewith arranged to embrace the upper portion of the opposite sides of said frame to guide said device in its travel across the frame.

2. The combination with a tray for incubators comprising, a frame and an egg supporting surface secured thereto, of an egg turning device connected at its ends to said frame for guidance to move longitudinally over the egg supporting surface to effect the turning of the eggs supported thereon, said device including a means rigid therewith and extending transversely below the bottom of said tray from one side of the tray to the other to prevent displacement of said device relative to said tray in the movement thereof across the egg supporting surface.

3. An incubator having, in combination, a reversible tray receivable in said incubator, an egg turning device mounted on said tray, a stationary part at the front side of the incubator, means projecting from said egg turning device arranged to engage said part when said tray is withdrawn from the incubator to effect a movement of said egg turning device across said tray, the front end of said tray being arranged to be lifted to disengage said means from said part to permit complete withdrawal of said tray from said incubator.

In testimony whereof, I have hereunto affixed my signature.

JOHN C. BOHMKER.